Aug. 18, 1931.  F. S. McCULLOUGH  1,819,783
RADIO CIRCUITS EMPLOYING ALTERNATING CURRENT RADIO TUBES
Filed May 4, 1925
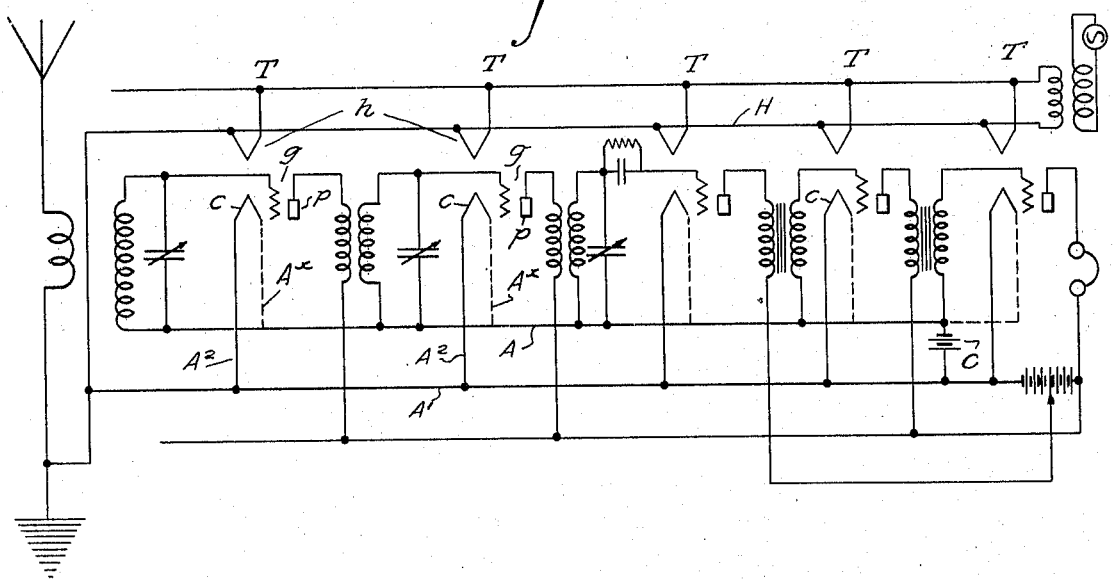
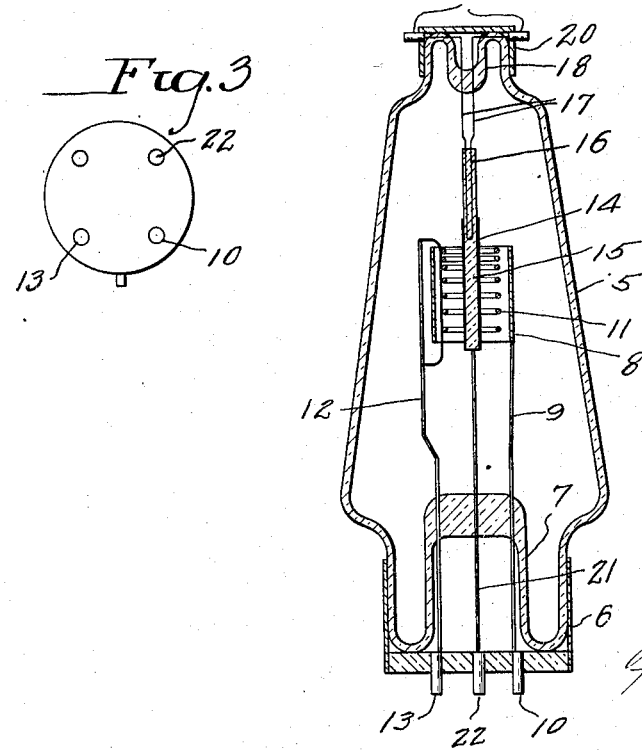
INVENTOR.
Frederick S. McCullough
BY O. M. Clarke
ATTORNEY.

Patented Aug. 18, 1931

1,819,783

UNITED STATES PATENT OFFICE

FREDERICK S. McCULLOUGH, OF WILKINSBURG, PENNSYLVANIA

RADIO CIRCUITS EMPLOYING ALTERNATING CURRENT RADIO TUBES

Application filed May 4, 1925. Serial No. 27,679.

This invention relates to a method of and a circuit for using radio tubes of the type having a cathode and a heater for the cathode. The invention pertains especially to the use of tubes constructed in accordance with my co-pending application for Patent Serial No. 12,477, filed March 2, 1925.

While a tube as constructed in accordance with my said invention effectively eliminates inductance effects of alternating pulsating currents in the tube itself, it is desirable, when using the tube in a set, to eliminate any reaction or capacity effects between the alternating or pulsating heater circuit and the tube circuit per se.

The present invention has for its object to provide a simple and convenient way of avoiding such reactions or effects.

Furthermore, in a tube of this type, there is only one cathode connection in the base, whereas, the usual tube having the direct heated cathode or filament has two cathode connections in its base, which cathode connections, make circuit with the filament heating or "A" battery, and whereas this A battery is not required with my tube, it will be seen that there is an open circuit across the usual A battery terminals of the receiving circuit.

According to a further object of the present invention, I propose to utilize present circuits in standard sets, or circuits in apparatus built specially for use with my tubes, by using the same circuit now employed and grounding the cathode of the tube to the common ground of the circuit through a small battery connected across what corresponds to the A battery circuit of present sets, so that the cathode of each tube in the circuit will have a potential opposite the potential on the grid. In other words, an object of the present invention is to so utilize a circuit that a bias or C battery is substituted across the terminals of what has heretofore been the A battery circuit, to bias the grid and avoid opening the circuit of each tube for a C battery connection.

The nature of the invention may be more readily understood by reference to the accompanying drawings, in which:

Fig. 1 is a simple circuit diagram illustrating the principle of the invention;

Fig. 2 represents a vertical section through a tube of the type shown in my said co-pending application; and Fig. 3 is an end view of the base of the tube.

In the drawings, Fig. 2 may be first referred to as illustrating the type of tube in connection with which the present invention is preferably to be practiced. In this figure, 5 designates the envelope of the tube, 6 the base, 7 the stem of the tube, and 8 is the plate or anode supported by wire 9 passing through the stem and attaching to pin 10 on the base. The grid is designated 11 and is supported on wire 12 passing through the stem and connecting with pin 13 on the base.

The cathode of the tube is a shell or tubular member 14 on a porcelain or other suitable rod 15. In the upper end of the rod, above the grid, is a resistance wire 16. Current is supplied to the resistance element 16 through wires 17 entering through an upper stem 18. These wires may connect with pins 19 in an upper cap 20. When the resistance wire is energized, the heat is carried along the porcelain stem to the metallic member 14, heating it to a point where it will sustain electron emission. Connection is made to the cathode 14 by a single wire 21 connected to pin 22 on the base of the tube.

The tube is adapted for use in practically any receiving set of present design using the standard or so-called "Navy" type of tube. The pin 22 is preferably so located as to correspond in position to the position of the positive "A" battery pin of the usual tubes.

In Fig. 1 I have illustrated a simple receiving circuit in which five tubes are employed, to provide two stages of tuned radio-frequency amplification, a detector, and two stages of audio frequency amplification. The circuit includes wires A and A' which are the usual "A" battery wires of a multiple tube receiving circuit. Ordinarily, one side of the filament of the usual tubes are connected to wire A' by wires A². The other filament terminal is ordinarily connected to wire A as indicated by dotted wires A$^x$.

When my alternating current tubes are substituted for the usual tube, wires A$^x$ are not utilized by reason of the fact that the tube has only three active connector pins on its base. Wire A, it will be noted, is on the grid side of the circuit. Since the usual "A" battery is not required to energize lines A and A′ to heat the filaments of the tubes, the grid circuit would, in a standard set, normally be open.

According to the present invention, lines A and A′ are connected by a small battery, frequently referred to in the art as a "C" battery, and designated in the drawings as C, with the negative pole thereof on the line A side of the circuit. This battery closes the otherwise open circuit between A and A′, and at the same time provides a simple way of putting a strong negative potential or "bias" on the grid of each tube. Such a bias on the grid is practically essential with tubes of the type having a unipotential cathode, and the present invention provides a simple manner of adapting the tube to an apparatus having standard circuits and at the same time biasing the grid without opening up the set.

In Fig. 1, the several tubes are designated T, while $h$ is the heater, $e$ the cathode, $g$ the grid, and $p$ the plate or anode.

With the tube as heretofore described, it will be noted that the wires leading to the heater are at the top of the tube, while the terminals to the electrodes of the tube are at the bottom. This permits the heater circuit H, that is, the alternating current circuit, to be disposed above and away from the receiving circuit. This is clearly shown by the wiring diagram of Fig. 1.

As certain capacity effects between the heater and the cathode and the heater circuit and the receiving circuit must necessarily otherwise exist, I have found that by grounding one side of the heater circuit, or connecting it to the cathode circuit through wire H, any undesirable effects due to the use of alternating currents in the heater circuit can be entirely eliminated.

It will thus be seen that I have devised a novel method of and apparatus for adapting alternating current tubes to present standard types of sets or circuits, or adaptable to circuits especially designed for my tubes, without any departure from present practice.

I claim as my invention:

1. A three-section radio circuit, including a radio amplifier, a detector, an audio amplifier, an audion tube in each of said sections, cathodes for each of said tubes, heater elements for said cathodes for heating the same by conduction, a source of alternating current multiply connected to said heater elements, control grids and anodes for each of said audion tubes, the leads extending from the grids, cathodes and plates being removed from the inductive field of the leads extending from a source of alternating current to the heaters, means connected between said grids and said cathodes for biasing said cathodes, means for tuning certain of the grid cathode circuits, a common conductor for connecting said heaters to said cathodes, and connections from said cathodes to said anodes.

2. A radio receiving circuit including a radio amplifier, a detector and an audio amplifier, an audion tube for said radio amplifier, an audion tube for said detector, an audion tube for said audio amplifier, an indirectly heated cathode for each of said audion tubes, a source of alternating current multiply connected to heaters for said cathodes, a grid for each of said audions connected to a common circuit, an anode for each of said audion tubes, a common circuit extending from said heaters to said cathodes, and means connected between said common circuit and the common circuit of said grids for securing a difference of potential between said grids and said cathodes.

3. The combination with a radio circuit for thermionic tubes, of tubes in the circuit having cathodes, looped means energized by an alternating current for heating the cathodes, an alternating current circuit multiply connected with the said heating means, one side of said alternating current circuit being grounded to one side of the radio circuit, a source of direct current connected to said radio circuit, circuit connections including a conductive path extending from a common conductor connected to said cathodes through said source of current to said grids, and means for tuning the circuits of said grids.

4. The combination with a radio circuit for thermionic tubes, of a tube in the circuit having a cathode and a grid, means energized by alternating current to heat the said cathode, an alternating current circuit connected with the said heating means, one side of said alternating current circuit being grounded to one side of the radio circuit, said alternating current circuit for the heater being located out of the inductive field of the said radio circuit to separate the alternating current leads from the grid, cathode and plate leads, thereby preventing an inductive effect upon the grid, cathode and plate leads from the alternating current leads, a source of unidirectional potential, a circuit including said source of unidirectional current extending from one side of the source of alternating current source to the said grid, and means for tuning the circuit of the said grid of said tube.

5. The combination with a radio receiving circuit utilizing a plurality of thermionic tubes connected in cascade and each having an anode, grid and cathode, a heater in each tube for the cathode adapted to be energized by alternating current to conductively heat the cathode to render the same active, a common connection for the grids of the several tubes, a common connection for the cathodes of the several tubes, a battery in series between the common grid connection and the common cathode connection, a circuit extending from said common grid connection to one side of the source of alternating current and including said battery, and means for resonating the grid circuits of said tubes.

6. A radio receiving circuit including a plurality of radio amplifiers and audio amplifiers, cathodes for each of said amplifiers, heater elements for said cathodes for heating the same by conduction, a source of alternating current multiply connected to said heater element, control grids and anodes for said amplifiers, external leads extending from the grid, cathode and plate elements removed from the inductive field of the leads extending from the source of alternating current to the heaters, a source of direct current supply, a common circuit extending from said grids through said source of current to said cathodes, means for tuning certain of said grid cathode circuits, a single connection outside of said tube extending from said heaters to said cathodes and to ground, and connections from said anodes to said cathodes.

In testimony whereof I hereunto affix my signature.

FREDERICK S. McCULLOUGH.